US006938164B1

(12) United States Patent
England et al.

(10) Patent No.: US 6,938,164 B1
(45) Date of Patent: Aug. 30, 2005

(54) METHOD AND SYSTEM FOR ALLOWING CODE TO BE SECURELY INITIALIZED IN A COMPUTER

(75) Inventors: Paul England, Bellevue, WA (US); Bryan Willman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 09/721,398

(22) Filed: Nov. 22, 2000

(51) Int. Cl.[7] ............................................. G06F 11/30
(52) U.S. Cl. ..................... 713/193; 713/100; 713/200; 380/277
(58) Field of Search ................ 713/200, 189, 713/190, 1, 187, 188, 2, 164, 193, 194, 192, 713/100; 380/259

(56) References Cited

U.S. PATENT DOCUMENTS

| | | | |
|---|---|---|---|
| 4,827,508 A | 5/1989 | Shear | |
| 4,969,189 A | 11/1990 | Ohta et al. | |
| 4,977,594 A | 12/1990 | Shear | |
| 5,023,907 A | 6/1991 | Johnson et al. | |
| 5,050,213 A | 9/1991 | Shear | |
| 5,140,634 A | 8/1992 | Guillou et al. | |
| 5,175,829 A * | 12/1992 | Stumpf et al. | ............... 712/203 |
| 5,276,311 A | 1/1994 | Hennige | |
| 5,335,334 A | 8/1994 | Takahashi et al. | |
| 5,349,643 A * | 9/1994 | Cox et al. | ................... 713/155 |
| 5,408,647 A | 4/1995 | Landry | |
| 5,410,598 A | 4/1995 | Shear | |
| 5,473,690 A | 12/1995 | Grimonprez et al. | |
| 5,473,692 A | 12/1995 | Davis | |
| 5,491,827 A | 2/1996 | Holtey | |
| 5,511,184 A | 4/1996 | Lin | |
| 5,544,246 A | 8/1996 | Mandelbaum et al. | |
| 5,557,518 A | 9/1996 | Rosen | |
| 5,654,746 A | 8/1997 | McMullan, Jr. et al. | |
| 5,664,016 A | 9/1997 | Preneel et al. | |
| 5,671,280 A | 9/1997 | Rosen | |
| 5,721,781 A | 2/1998 | Deo et al. | |
| 5,724,527 A | 3/1998 | Karnik et al. | |
| 5,745,886 A | 4/1998 | Rosen | |
| 5,757,919 A | 5/1998 | Herbert et al. | |
| 5,778,070 A * | 7/1998 | Mattison | ..................... 713/191 |

(Continued)

FOREIGN PATENT DOCUMENTS

EP 695985 2/1996

(Continued)

OTHER PUBLICATIONS

486 Microprocessors, SSV Software Systems PC/104 Products, http://www.ssv-embedded.de/ssv/pc104/p71.htm, Mar. 13, 1998.*

(Continued)

*Primary Examiner*—Sam Rimell
*Assistant Examiner*—Jacob F. Betit
(74) *Attorney, Agent, or Firm*—Lee & Hayes, PLLC (57) ABSTRACT

A memory controller prevents CPUs and other I/O bus masters from accessing memory during a code (for example, trusted core) initialization process. The memory controller resets CPUs in the computer and allows a CPU to begin accessing memory at a particular location (identified to the CPU by the memory controller). Once an initialization process has been executed by that CPU, the code is operational and any other CPUs are allowed to access memory (after being reset), as are any other bus masters (subject to any controls imposed by the initiated code).

51 Claims, 5 Drawing Sheets

U.S. PATENT DOCUMENTS

| | | | |
|---|---|---|---|
| 5,787,427 | A | 7/1998 | Benantar et al. |
| 5,796,824 | A | 8/1998 | Hasebe et al. |
| 5,812,662 | A | 9/1998 | Hsu et al. |
| 5,812,980 | A | 9/1998 | Asai |
| 5,841,869 | A | 11/1998 | Merklin et al. |
| 5,867,655 | A * | 2/1999 | DeRoo et al. .............. 709/213 |
| 5,872,847 | A | 2/1999 | Boyle et al. |
| 5,892,900 | A | 4/1999 | Ginter et al. |
| 5,892,902 | A | 4/1999 | Clark |
| 5,892,904 | A | 4/1999 | Atkinson et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,919,257 | A | 7/1999 | Trostle |
| 5,920,861 | A | 7/1999 | Hall et al. |
| 5,933,498 | A | 8/1999 | Schneck et al. |
| 5,940,504 | A | 8/1999 | Griswold |
| 5,943,422 | A | 8/1999 | Van Wie et al. |
| 5,944,821 | A | 8/1999 | Angelo |
| 5,949,876 | A | 9/1999 | Ginter et al. |
| 5,953,502 | A | 9/1999 | Helbig, Sr. |
| 5,958,050 | A | 9/1999 | Griffin et al. |
| 5,963,980 | A | 10/1999 | Coulier et al. |
| 5,982,891 | A | 11/1999 | Ginter et al. |
| 5,991,399 | A | 11/1999 | Graunke et al. |
| 5,991,876 | A | 11/1999 | Johnson et al. |
| 6,006,332 | A | 12/1999 | Rabne et al. |
| 6,009,274 | A | 12/1999 | Fletcher et al. |
| 6,009,401 | A | 12/1999 | Horstmann |
| 6,026,166 | A | 2/2000 | LeBourgeois |
| 6,032,257 | A | 2/2000 | Olarig et al. |
| 6,038,551 | A | 3/2000 | Barlow et al. |
| 6,073,124 | A | 6/2000 | Krishnan et al. |
| 6,092,189 | A | 7/2000 | Fisher et al. |
| 6,105,137 | A | 8/2000 | Graunke et al. |
| 6,112,181 | A | 8/2000 | Shear et al. |
| 6,118,873 | A | 9/2000 | Lotspiech et al. |
| 6,138,119 | A | 10/2000 | Hall et al. |
| 6,148,387 | A | 11/2000 | Galasso et al. |
| 6,148,402 | A | 11/2000 | Campbell |
| 6,157,721 | A | 12/2000 | Shear et al. |
| 6,175,917 | B1 | 1/2001 | Arrow et al. |
| 6,185,678 | B1 | 2/2001 | Arbaugh et al. |
| 6,185,683 | B1 | 2/2001 | Ginter et al. |
| 6,189,100 | B1 | 2/2001 | Barr et al. |
| 6,192,473 | B1 | 2/2001 | Ryan, Jr. et al. |
| 6,212,636 | B1 | 4/2001 | Boyle et al. |
| 6,223,284 | B1 | 4/2001 | Novoa et al. |
| 6,229,894 | B1 | 5/2001 | Van Oorschot et al. |
| 6,230,285 | B1 | 5/2001 | Sadowsky et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,263,431 | B1 | 7/2001 | Lovelace et al. |
| 6,272,629 | B1 | 8/2001 | Stewart |
| 6,292,569 | B1 | 9/2001 | Shear et al. |
| 6,327,652 | B1 | 12/2001 | England et al. |
| 6,330,588 | B1 | 12/2001 | Freeman |
| 6,338,139 | B1 | 1/2002 | Ando et al. |
| 6,341,373 | B1 | 1/2002 | Shaw |
| 6,363,486 | B1 | 3/2002 | Knapton, III |
| 6,363,488 | B1 | 3/2002 | Ginter et al. |
| 6,367,012 | B1 | 4/2002 | Atkinson et al. |
| 6,378,072 | B1 * | 4/2002 | Collins et al. .............. 713/187 |
| 6,381,741 | B1 | 4/2002 | Shaw |
| 6,389,402 | B1 | 5/2002 | Ginter et al. |
| 6,389,537 | B1 | 5/2002 | Davis et al. |
| 6,427,140 | B1 | 7/2002 | Ginter et al. |
| 6,449,367 | B2 | 9/2002 | Van Wie et al. |
| 6,477,252 | B1 * | 11/2002 | Faber et al. ................. 380/200 |
| 6,477,648 | B1 | 11/2002 | Schell et al. |
| 6,480,948 | B1 * | 11/2002 | Virajpet et al. ............. 711/202 |
| 6,480,961 | B2 | 11/2002 | Rajasekharan et al. |
| 6,546,489 | B1 * | 4/2003 | Frank et al. ................. 713/187 |
| 6,557,104 | B2 * | 4/2003 | Vu et al. ..................... 713/189 |
| 6,560,706 | B1 | 5/2003 | Carbajal et al. |
| 2001/0025281 | A1 | 9/2001 | Hirayama |
| 2002/0007452 | A1 | 1/2002 | Traw et al. |
| 2002/0069395 | A1 | 6/2002 | Howard et al. |
| 2002/0107803 | A1 | 8/2002 | Lisanke et al. |
| 2002/0120936 | A1 | 8/2002 | Del Beccaro et al. |
| 2002/0152173 | A1 | 10/2002 | Rudd |

FOREIGN PATENT DOCUMENTS

| | | |
|---|---|---|
| GB | 2260629 | 4/1993 |
| WO | WO9938070 | 7/1999 |

OTHER PUBLICATIONS

"Facing an Internet Security Minefield,Microsoft Hardens NT Server Defenses", Young R., Windows Watcher, Sep. 12, 1997, vol. 7, Issue 9, p1, 6p, 1 chart.

"Phoenix Technologies Partners with Secure Computing in Enterprise Security Marketplace", Jul. 12, 2001, Business Wire, Courtesy of Dialog Text Search, p. 1-2.

Murphy et al., "Preventing Piracy: Authorization Software May Ease Hollywood's Fear of the Net", Internet World Magazine, Apr. 1, 2000, 3 pages.

"Internet Security: SanDisk Products and New Microsoft Technology Provide Copy Protected Music for Internet Music Player Market. (Product Annoucement)", Edge: Work Group Computing Report, Apr. 19, 1999, 2 pages.

Arbaugh et al., "A Secure and Reliable Bootstrap Architecture", Distributed Systems Laboratory, Philadelphia, PA, 1997, pp. 65-71.

Lampson et al., "Authentication in Distributed Systems: Theory and Practice", Digital Equipment Corporation, ACM Transactions on Computer Systems, vol. 10, No. 4, Nov. 1992, pp. 265-310.

Clark et al., "Bits: A Smartcard Protected Operating System", Communications on the ACM, vol. 37, No. 11, Nov. 1994, pp. 66-70, 94.

Yee, "Using Secure Coprocessors", School of Computer Science, Carnegie Mellon University, 1994, 104 pgs.

Abadi et al., "Authentication and Delegation with Smartcards", Jul. 30, 1992, 30 pgs.

Schneier, B., "Applied Cryptography", Applied Cryptography. Protocols, Algoriths, and Source Code in C, 1996, pp. 574-577.

"Secure Management Information Exchange", Bhatti et al., Journal of Network and Systems Management, vol. 4, No. 3, 1996, pp. 251-277.

"Security Enhancement for the "Simple Authentication Key Agreement Algorithm"", Lin et al., IEEE 2000, pp. 113-115.

"Techniques for secure execution of mobile code: a review", J.M. Mas-Ribes and Benoit Macq, Ann. Telecommun., 55, n 7-8, 2000, pp. 1-9.

"Security Agility for Dynamic Execution Environments", Petkac et al., IEEE 1999, pp. 377-390.

* cited by examiner

METHOD AND SYSTEM FOR ALLOWING CODE TO BE SECURELY INITIALIZED IN A COMPUTER

TECHNICAL FIELD

This invention relates to secure code execution, and more particularly to a method and system for allowing code to be securely initialized in a computer.

BACKGROUND OF THE INVENTION

Having people be able to trust computers has become an increasingly important goal. This trust generally focuses on the ability to trust the computer to use the information it stores or receives correctly. Exactly what this trust entails can vary based on the circumstances. For example, multimedia content providers would like to be able to trust computers to not improperly copy their content. By way of another example, users would like to be able to trust their computers to forward confidential financial information (e.g., bank account numbers) only to appropriate destinations (e.g., allow the information to be passed to their bank, but nowhere else). Unfortunately, given the generally open nature of most computers, a wide range of applications can be run on most current computers without the user's knowledge, and these applications can compromise this trust (e.g., forward the user's financial information to some other destination for malicious use).

To address these trust issues, different mechanisms have been proposed (and new mechanisms are being developed) that allow a computer or portions thereof to be trusted. Generally, these mechanisms entail some sort of authentication procedure where the computer can authenticate or certify that at least a portion of it (e.g., certain areas of memory, certain applications, etc.) are at least as trustworthy as they present themselves to be (e.g., that the computer or application actually is what it claims to be). In other words, these mechanisms prevent a malicious application from impersonating another application (or allowing a computer to impersonate another computer). Once such a mechanism can be established, the user or others (e.g., content providers) can make a judgment as to whether or not to accept a particular application as trustworthy (e.g., a multimedia content provider may accept a particular application as being trustworthy, once the computer can certify to the content provider's satisfaction that the particular application is the application it claims to be). However, installing such mechanisms on a computer can be difficult, as they require protection against a malicious application interfering with the mechanism (e.g., a malicious application impersonating the trusted mechanism).

One solution is to build a computer that includes a trustworthy mechanism for booting the computer. However, booting a computer typically involves using various pieces of code, often referred to as the basic input output system (BIOS) and potentially many option read only memories (ROMs) or BIOS extensions, that operate to load the operating system from some other storage device (typically a hard disk drive). Thus, a trustworthy mechanism for booting the computer would require that the BIOS be trustworthy, each of the option ROMs be trustworthy, and each of the BIOS extensions be trustworthy, before a trustworthy operating system can be loaded into the computer. Not only is it difficult to have each of these components trustworthy, but the BIOS, option ROMs, and BIOS extensions are frequently stored on devices that can be re-written in the computer (e.g., Flash memory), and thus the integrity thereof compromised. Therefore, building a computer that includes a trustworthy mechanism for booting the computer can be problematic.

The invention described below addresses these disadvantages, providing a method and system for allowing code to be securely initialized in a computer.

SUMMARY OF THE INVENTION

A method and system for allowing code to be securely initialized in a computer is described herein.

According to one aspect, a memory controller prevents CPUs and other I/O bus masters from accessing memory during a code (for example, OS, microkernel, or other trusted core) initialization process. The memory controller resets CPUs in the computer and allows a CPU to begin accessing memory at a particular location (identified to the CPU by the memory controller). Once an initialization process has been executed by that CPU, the code is operational and any other CPUs are allowed to access memory (after being reset), as are any other bus masters (subject to any controls imposed by the initiated code).

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

A method and system for allowing code (e.g., software instructions) to be securely initialized in a computer is described herein. This secure code initialization process is described primarily with reference to initializing a trusted core in a computer. However, the secure code initialization process can be used to securely initialize any of a wide variety of types of code, without regard for how trustworthy the code is. The mechanism described herein is of particular interest because no changes to the core-CPU, and few changes to the CPU supporting logic, are required.

As used herein, code being "trusted" refers to code that is immutable in nature and immutable in identity. Code that is trusted is immune to being tampered with by other parts (e.g. code) of the computer and it can be reliably and unambiguously identified. In other words, any other entity or component asking "who is this code" can be told "this is code xyz", and can be assured both that the code is indeed code xyz (rather than some imposter) and that code xyz is unadulterated. Trust does not deal with any quality or usefulness aspects of the code—only immutability of nature and immutability of identity. The method and system described herein can be used to allow trusted code to know that it started execution in an orderly state, providing immutability of initialization.

Figure 1:
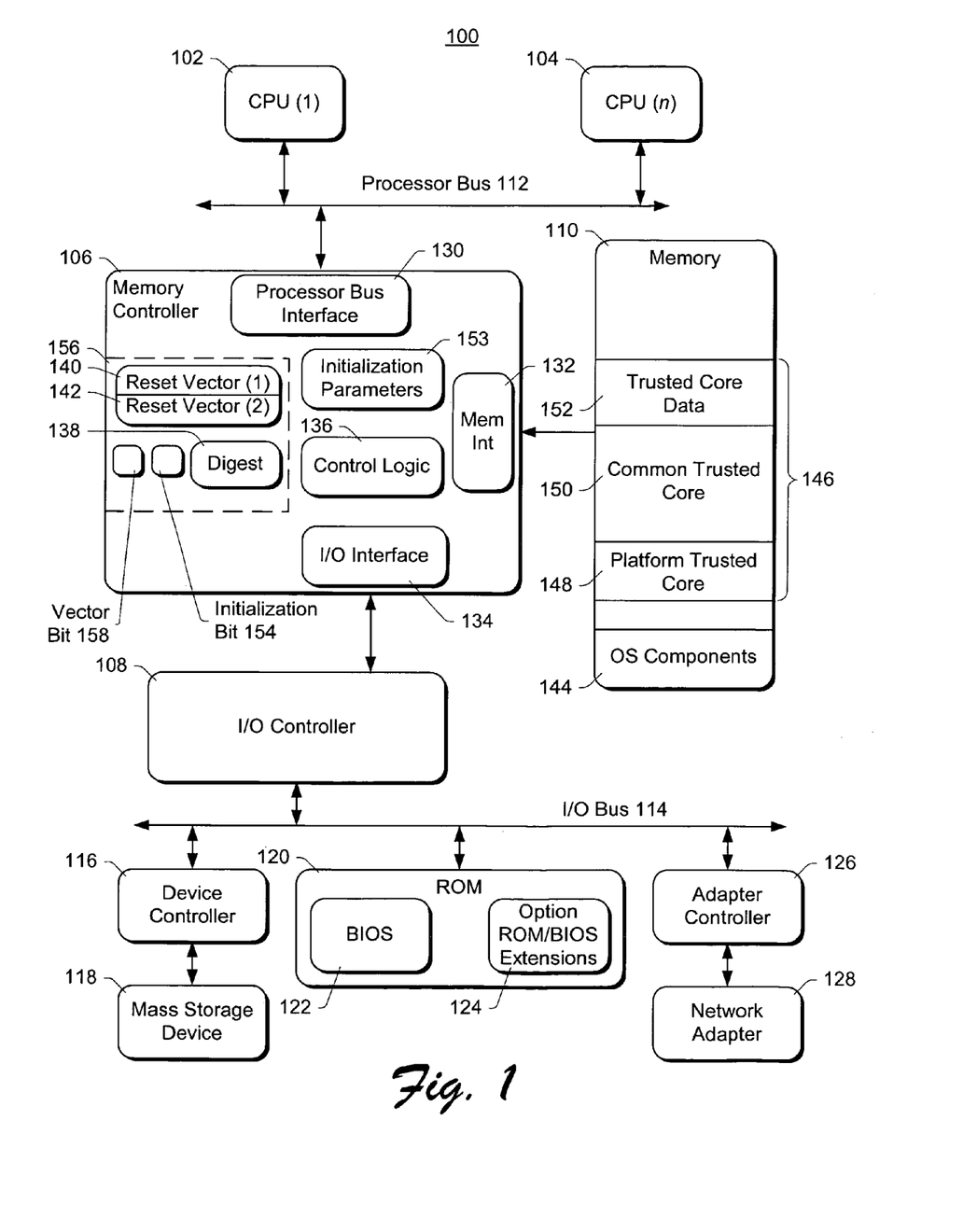
FIG. 1 is a block diagram illustrating an exemplary computer in accordance with certain embodiments of the invention.

FIG. 1 is a block diagram illustrating an exemplary computer 100 in accordance with certain embodiments of the invention. Computer 100 is intended to represent a wide variety of computing devices, such as personal computers (PCs), hand-held or pocket devices, personal digital assistants (PDAs), gaming consoles, Internet appliances, multiprocessor or single-processor systems, microprocessor-based or programmable consumer electronics, network PCs, minicomputers, mainframe computers, embedded systems, etc.

Computer 100 includes one or more central processing units (CPUs) or processors 102, 104, a memory controller 106, an I/O controller 108, and system memory 110. CPUs 102 and 104 represent any of a wide variety of processors, such as x86-architecture (or compatible) processors, PowerPC-architecture (or compatible) processors, etc. Although multiple (n) CPUs 102, 104 are illustrated in FIG. 1, computer 100 can alternatively be implemented with only a single CPU. The CPUs 102, 104 are coupled together and to memory controller 106 via a processor bus 112.

Memory controller 106 is illustrated as a separate component, but may alternatively be incorporated into another component or device, such as a bridge including an interrupt controller, accelerated graphics port (AGP), etc. Memory controller 106 communicates with CPUs 102, 104, I/O controller 108, and is memory 110. Memory 110 represents a system memory, such as a random access memory (RAM). I/O controller 108 operates as a bridge or interface between various I/O devices coupled to an I/O bus 114 and other components within computer 100. Any of a wide variety of conventional I/O devices can be coupled to I/O bus 114. In the illustrated example, a mass storage device controller 116 is coupled to bus 114 and a mass storage device (e.g., a hard disk) 116, a ROM 120 (including a BIOS 122 and option ROMs and/or BIOS extensions 124) is coupled to bus 114, and an adapter controller 126 is coupled to bus 114 and a network adapter 128 (e.g., network interface card (NIC) or modem).

Memory controller 106 includes a processor bus interface 130, a memory interface 132, an I/O interface 134, a control logic (also referred to as a processor or controller) 136, a digest 138, two reset vectors 140, 142, and initialization parameters 153. Processor bus interface 130 operates as an interface between memory controller 106 and processor bus 112, allowing memory controller 106 to receive commands and requests from CPUs 102, 104 as well as communicate responses and commands to CPUs 102, 104. Memory interface 132 operates as an interface to system memory 110, allowing controller 106 to read data stored in memory 110 and write data to memory 110. I/O interface 134 operates as an interface to I/O controller 108, allowing I/O components 118, 120, and 128 to communicate with memory controller 106 and vice versa via I/O controller 108. In the illustrated example, communications to and/or from a component internal to =controller 106 (e.g., control logic 136, reset vectors 140, 142, etc.) are passed through the appropriate interface.

Selected ones of I/O components coupled to I/O bus 114 may operate as bus masters. A bus master refers to a device (typically other than a CPU) that is capable of driving address bus signals and other bus control signals on a bus. Examples of bus masters are mass storage device controller 116 and network adapter controller 126. Bus masters can communicate with memory 110 via I/O controller 108 and 106, such as to perform direct memory access (DMA) transfers to and/or from memory 110, thereby alleviating a CPU 102, 104 from having to directly manage such transfers.

In the illustrated example of FIG. 1, I/O controller 108 communicates directly with memory controller 106. Alternatively, these communications may not pass through memory controller 106, but rather through a processor to I/O bridge (not shown). Additionally, a processor to I/O bridge also allows for communications between I/O controller 108 and CPUs 102, 104 on processor bus 112. In one implementation, memory controller 106 is included as part of a "chipset" that also includes such a processor to I/O bridge. A chipset refers to a set of one or more chips that provides the interfaces between the computer's subsystems, and includes the buses and electronics to allow the CPUs, memory, I/O devices, etc. to interact.

Control logic 136 operates to ensure a trusted core can be loaded securely in computer 100, allowing accesses to memory 110 only under specific circumstances, as discussed in more detail below. Control logic 136 can be implemented in any of a variety of manners, such as a microcontroller executing microcode (stored in a nonvolatile secure location (e.g., within controller 106) accessible only to the microcontroller), a programmable logic device or other application specific integrated circuit (ASIC), etc.

Upon starting-up (e.g., powering-on or resetting) computer 100, the state of memory 110 is typically not guaranteed. Memory 110 is typically a dynamic RAM (DRAM) which requires periodic refreshing in order to maintain its state, so any state would have been lost when computer 100 was not powered. Memory 110 can be configured to be at a particular state (e.g., storing all zeroes or all ones) at power-on, or alternatively memory 110 may store random values (e.g., whatever values the individual memory cells stabilized to during power-on). Regardless, memory 110 stores no reliable data or instructions upon power-on. It should be noted that the contents of memory are more or less random when starting-up the entire computer system or just the memory. However, power-up and/or resetting of the CPU(s) do not typically alter the state of the memory (so the contents of memory are not necessarily random after simply resetting a CPU).

After computer 100 has been powered-on, one of CPUs 102, 104 will eventually begin executing instructions. Only one of CPUs 102, 104 may initially begin executing instructions, or alternatively one of CPUs 102, 104 may be selected to begin booting the computer. Any of a wide variety of arbitration mechanisms can be used to determine which of multiple CPUs is to begin booting the computer, such as a pre-configured default processor, a distributed arbitration scheme, an arbitration device or component (not shown) coupled to processor bus 112, etc.

Regardless of how many CPUs or which CPU begins execution of instructions, at least one CPU does begin executing instructions. As computer 100 has just been powered-on, no instructions are stored in the CPU's cache memory (or any other cache memory that may be present in computer 100). The CPU obtains instructions from BIOS 122 and begins executing those instructions. In one implementation, the CPU is configured to initially place a read request for a particular address (e.g., $FFFFFFF0_{16}$) on processor bus 112. Memory controller 106 responds with the address of a BIOS boot block (an address in BIOS 122) at which the CPU should begin executing instructions. This address returned by memory controller 112 is referred to as the reset vector, and in this (common) example, is provided by external logic. In an alternative implementation, the CPU simply begins fetching instructions directly from a particular location (for example, $00000000_{16}$), so in this case the reset vector is fixed.

The CPU then begins loading and executing instructions starting with this reset vector. The instructions loaded are from ROM 120, and can include instructions from BIOS 122 as well as one or more option ROMs and/or BIOS extensions 124. Some instructions from ROM 120 will result in instructions being loaded into memory 110 (either from ROM 120 or another device, such as mass storage device 118) that are then loaded by the CPU and executed.

Various components 144 of an operating system are thus loaded into memory 110, from ROM 120 and/or other devices (e.g., storage device 118). The components 144 can include portions of BIOS 122 as well as option ROMs and BIOS extensions 124. OS components 144 may also include selected components of a general purpose operating system, such as any of the Windows® family of operating systems available from Microsoft Corp. of Redmond, Wash.

Eventually, a trusted core is loaded into memory 110. This can be in response to, for example, instructions in BIOS 122, an option ROM or BIOS extension 124, an OS component 144, or another application (not shown). A trusted core refers to trustworthy code (e.g., software instructions) that controls at least a portion of the operation of computer 100, and knows how to protect itself (at least to some extent) on the particular hardware of computer 100. In protecting itself, the trusted core is also able to protect other applications running under the control of the trusted core. The amount of protection provided by the trusted core, as well as the manner in which such protection is provided by the trusted core, can vary among computers, computer (or CPU) architectures, and trusted cores. The trusted core may include all of the functionality of a typical operating system, or alternatively only selected functionality. The trusted core is typically cryptographically certified in some manner, allowing the integrity of the trusted core to be verified at a later time. For example, a cryptographic measure of the trusted core may be extracted from the trusted core and stored along with the trusted core on a mass storage device 118 (or on some remote device). When the trusted core is later loaded into memory 110, a component of computer 100 can extract the cryptographic measure of the trusted core in memory 110 for comparison to the stored cryptographic measure—if the two measures match then it can be safely assumed that the trusted core has not been altered (e.g., by a malicious user or program) while on device 118 or in memory 110.

In the illustrated example, the extracted cryptographic measure is stored in digest 138. Digest 138 refers to one or more registers (or other storage mechanisms) used to store a cryptographic measure of the trusted core as it is loaded. One such measure is a "cryptographic digest" that is calculated using a one-way hashing operation, such as SHA-1 (Secure Hash Algorithm 1). The cryptographic digest has the property that it is extremely difficult to find a second pre-image (in this case, a second trusted core) that when digested produces the same hash value. Hence the digest-register contains a value that can be considered to uniquely represent the trusted core in use. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

Alternatively, measures other than a digest can be used. For example, the logic could require that the trusted core be accompanied by a digital certificate(s). The chipset could ensure that the certificate(s) matches the trusted core image, and then save the certificate(s), a public key(s) obtained from the certificate(s), or a digest(s) of the certificate(s) in the register.

Eventually, the computer is ready to load and initialize the component that will provides the "root of trust" for the running computer. A significant problem faced in previous computers is that all code that has executed beforehand can subvert the execution of the trusted core by programming the CPUs or other devices to misbehave. For instance, a bad OS-loader could arrange that a bus mastering controller should, after a brief delay, subvert the new component by writing untrusted code over it. The invention described herein removes all previously executing code from the trust chain.

Figure 2:
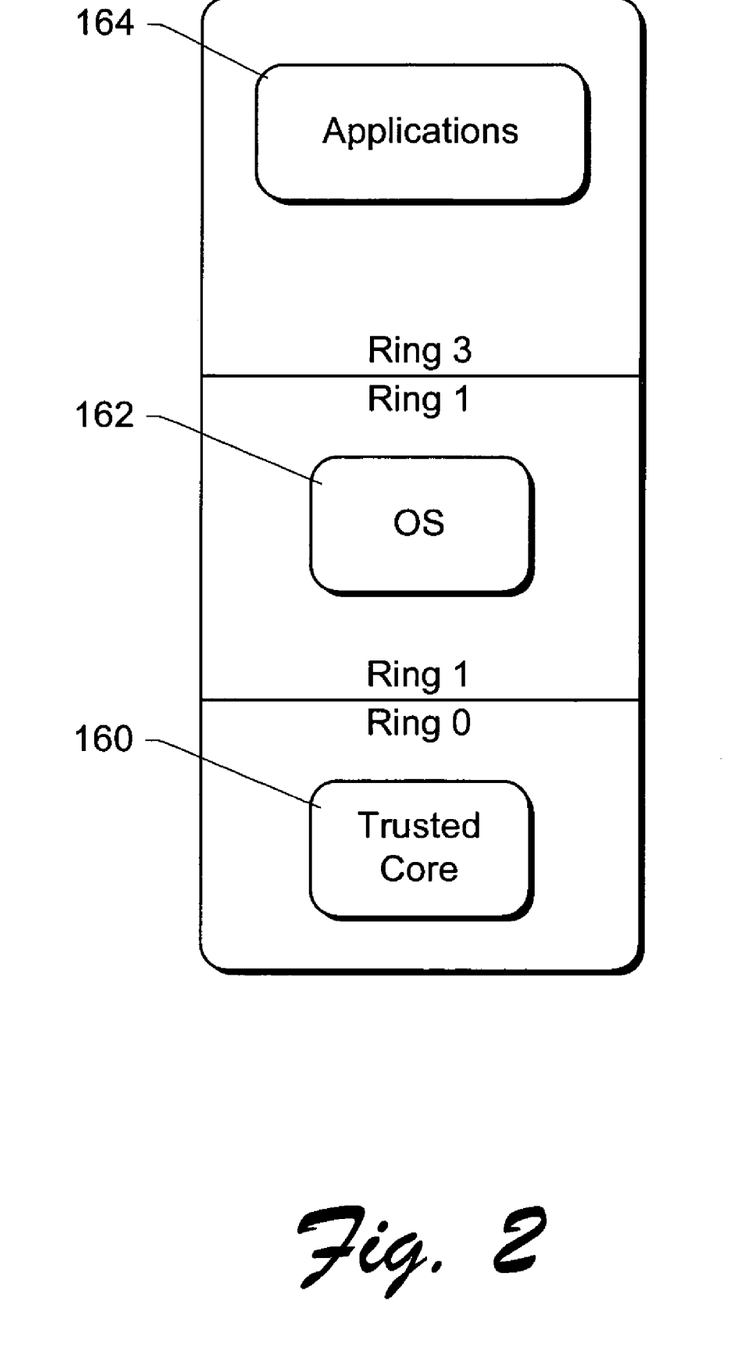
FIGS. 2 and 3 illustrate exemplary manners in which a trusted core can be implemented.
Figure 3:
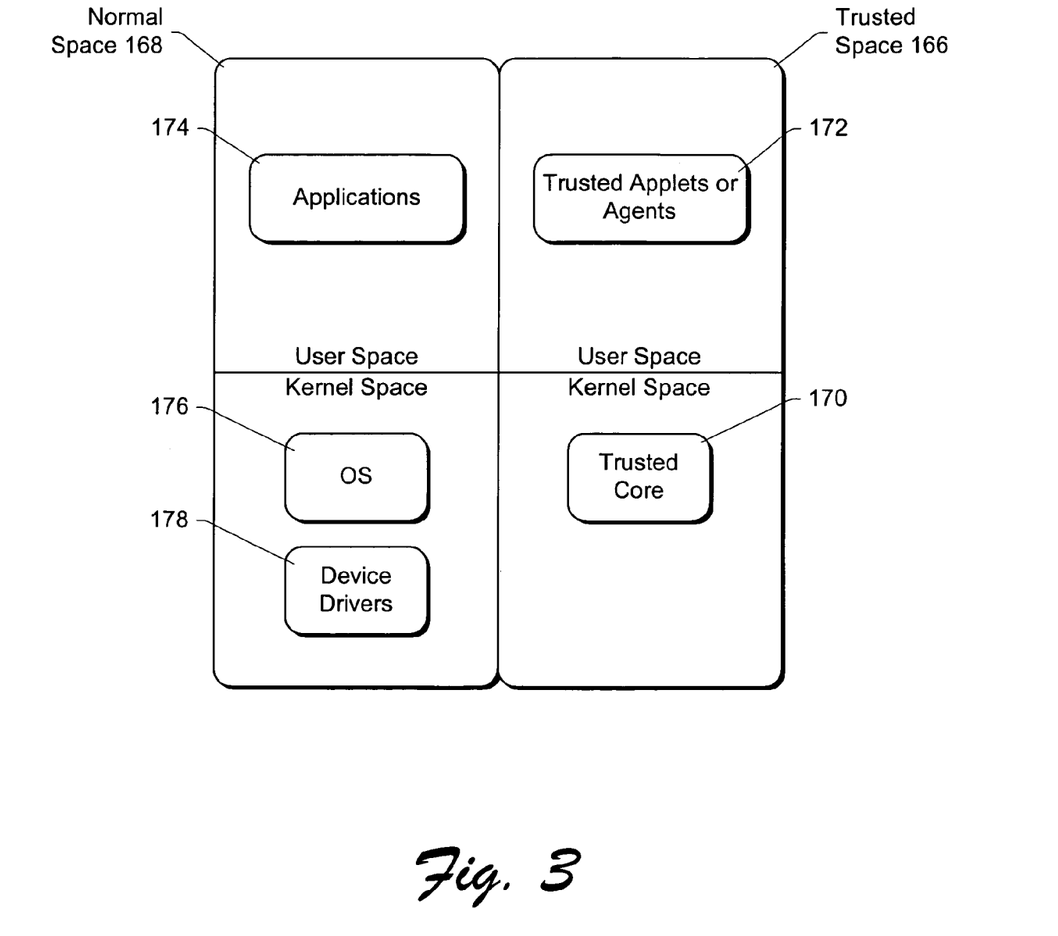

The trusted core can operate in any of a wide variety of manners to make itself trustworthy. The manner in which the trusted core operates can vary, as can the amount of security or trustworthiness provided by the trusted core. FIGS. 2 and 3 illustrate exemplary manners in which a trusted core can be implemented. FIGS. 2 and 3, however, illustrate only examples of how the trusted core can be implemented, and the trusted core can actually be implemented in different manners. Generally, the trusted core can use whatever facilities are provided by the computer components to protect itself once allowed to execute, such as rings, curtaining, etc.

It should be noted that the invention described herein does not limit the nature of the code that will comprise the "root of trust." It is anticipated that this code will take measures (such as programming the CPU memory controllers) to protect itself from code it might run, or devices it might program. However, the "root of trust" may be a full OS, a microkernel, a Hypervisor, or some smaller component that provides specific security services. Hereafter, we refer to such a component as the "trusted core."

In FIG. 2, the trusted core is implemented by taking advantage of different privilege levels of CPUs 102, 104 of FIG. 1 (e.g., rings in an x86 architecture processor). In the illustrated example, these privilege levels are referred to as rings, although alternate implementations using different processor architectures may use different nomenclature. The multiple rings provide a set of prioritized levels that software can execute at, often including 4 levels (Rings 0, 1, 2, and 3). Ring 0 is typically referred to as the most privileged ring. Software processes executing in Ring 0 can typically access more features (e.g., instructions) than processes executing in less privileged Rings. Furthermore, a processor executing in a particular Ring cannot alter code or data in a higher priority ring. In the illustrated example, a trusted core 160 executes in Ring 0, while an operating system 162 executes in Ring 1 and applications execute in Ring 3. Thus, trusted core 160 operates at a more privileged level and can control the execution of operating system 162 from this level. Additionally, the code and/or data of trusted core 160 (executing in Ring 0) cannot be altered directly by operating system 162 (executing in Ring 1) or applications 164 (executing in Ring 3). Rather, any such alterations would have to be made by the operating system 162 or an application 164 requesting trusted core 160 to make the alteration (e.g., by sending a message to trusted core 160, invoking a function of trusted core 160, etc.).

Alternatively, the operating system may be separated into a memory manager component that operates as trusted core 160 with the rest of the operating system operating as OS 162. The trusted core 160 then controls all page maps and is thus able to shield trusted agents executing in Ring 3 from other components (including OS 162). In this alternative, additional control also needs to be added (e.g., in memory controller 106 of FIG. 1) to protect the trusted core from other busmasters that do not obey ring privileges.

In FIG. 3, the trusted core is implemented by establishing two separate "spaces" within computer 100: a trusted space 166 (also referred to as a protected parallel area, or curtained memory) and a normal (untrusted) space 168. These spaces can be, for example, one or more address ranges within computer 100. Both trusted space 166 and normal space 168 include a user space and a kernel space, with the trusted core 170 being implemented in the kernel space of trusted space 166. A variety of trusted applets, applications, and/or agents can execute within the user space of trusted space 166, under the control of trusted core 170. However, any application 174, operating system 176, or device driver 178 executing in normal space 168 is prevented, by trusted core 170, from accessing trusted space 166. Thus, no alterations can be made to applications or data in trusted space 166 unless approved by trusted core 170.

Returning to FIG. 1, the trusted core 146 is illustrated in three portions: a platform trusted core portion 148, a common trusted core portion 150, and a trusted core data portion 152. Although the portions 148, 150, and 152 are illustrated as being arranged contiguously in memory 110, the portions need not be so arranged. E.g., different portions can be stored in different non-contiguous areas, and different sections of each portion can be stored in different non-contiguous areas. Alternatively, depending on the manner in which trusted core 146 operates when executing, the portions may need to be arranged in physically contiguous locations within memory 110 (that is, actually stored in physically contiguous locations of the RAM, not being paged out to another device in accordance with virtual memory).

Trusted core data portion 152 is an area of memory 110 that is used to store data used by the trusted core. Platform trusted core portion 148 includes code that is specific to the particular hardware used in computer 100 (e.g., the specific type of CPU, the type of chipset, etc.). Common trusted core portion includes code that implements the operation and functionality of the trusted core but is not specific to the particular hardware used in computer 100. By separating the two portions 148 and 150, the specifics of how interaction with the hardware of computer 100 (e.g., how to set a timer) can be abstracted to portion 150 by portion 148, so the same common trusted core portion can be used on different computers. For example, the common trusted core code 150 can operate as if all timers were set in the same manner, while platform trusted core code 148 operates to convert the instructions from code 150 into commands that are actually understood by the underlying hardware of computer 100.

Trusted core 146 can be loaded into memory 110 from the same source or alternatively different sources. By way of example, platform trusted core portion 148 may be loaded into memory 110 from the chipset of computer 100 (the chipset refers to a set of one or more chips the provides the interfaces between the computer's subsystems, including the buses and electronics to allow the CPUs, memory, I/O devices, etc. to interact, and may include memory controller 106, I/O controller 108, and buses 112 and 114), while the common trusted core portion 150 may be loaded into memory 110 from mass storage device 118. By way of another example, one portion 148, 150, or 152 may be loaded into memory 110 from network adapter 128 (e.g., from a remote server), or the portions may all be loaded from network adapter 128 but from different sources (e.g., different remote servers). Additionally, different parts of one or more of portions 148, 150, and 152 may be loaded from different sources (e.g., part of portion 150 may be loaded into memory 110 from mass storage device 118 and another part of portion 150 may be loaded from a remote server via network adapter 128).

Additionally, each portion may be generated by combining various overlaid parts from one or more sources. For example, a first part could be read from one source (e.g., a local disk) and a second part read from another source (e.g., a remote server over the network), and then the two parts could be combined (e.g., exclusive-OR the bits of each part) to generate the portion.

It should be noted that the trusted core 146 need not be stored in a secure location and/or loaded into memory 110 in a secure manner. The trusted core 146 may be stored on any publicly-accessible (or semi-publicly accessible) area, such as mass storage device 118, a remote server accessed via network adapter 128, etc. Rather, a cryptographic measure of trusted core 146 can be verified after loading into memory 110 (and after it is protected so that no further modifications by untrusted code are possible). The cryptographic measure can be generated in any of a wide variety of conventional manners, and is designed so that any change in the trusted core is reflected in the cryptographic measure. For example, if a malicious user were to attempt to alter the trusted core by deleting or modifying an instruction(s), or adding a new instruction(s), in an attempt to subvert the security of the trusted core, that alteration would be reflected in the cryptographic measure (so any subsequently generated cryptographic measure would not match a previously generated cryptographic measure due to the change in the instruction(s)). In one implementation, the cryptographic measure is obtained by generating a digest value of the trusted core, such as in accordance with the well-known SHA, SHA-1, MD5 (Message Digest 5), etc. algorithms.

This cryptographic measure is generated during the secure initialization process described herein, and is made subsequently available to challengers (e.g., a bank, IT administrator, smart card, etc.). Interpreting the digest can be done in several ways. It could be a "well known" value, such as a company publishing the expected value of the its trusted core on its web site. Alternatively, the company may generate a certificate for each trusted core it writes, and ship it with the trusted core (or make it available on a web site). This allows challengers to see the digest and ask for (or look for) a certificate that "names" the digest. It should be noted that this certificate should not be in the core itself because the certificate names the digest.

It should be noted that the initialization process described herein does not limit what a user may try to run as the "trusted core"—the user can try to run virtually any set of instructions as the trusted core. However, if the trusted core is tampered with, then the instructions attempting to run as the "trusted core" (the tampered with trusted core) will not be trusted by other parties because the tampered with trusted core will have a different cryptographic measure and will not have access to keys that are accessible to the non-tampered with trusted core.

It should also be noted that the initialization process described herein naturally and easily allows a computer to run different trusted cores serially, at arbitrary times, without re-booting the system. For example, the user can begin executing trusted core x, then switch to executing trusted core y (which may be a different version of the trusted core x, or an entirely different trusted core), and then switch to trusted core z (or back to trusted core x), etc.

Memory controller 106 operates to ensure that trusted core 146, once loaded into memory 110, can be initialized and begin execution in such a manner that any previous state of computer 100 does not compromise the integrity of the initialization process. It should be noted memory controller 106 operates to provide a secure environment in which the trusted core can be initialized. However, once the initialization process is completed, trusted core 146 is responsible for its own security. Additionally, memory controller 106 does not generate any guarantees or assurances regarding the trustworthiness or security provided by trusted core 146.

Initialization of trusted core 146 refers to beginning execution of trusted core 146. This initialization typically occurs after trusted core 146 has been loaded in its entirety into memory 110, although alternative implementations may allow for some parts of code 146 to be loaded into memory after the initialization process occurs. The initialization process is performed by a set of trusted core initialization instructions that are part of trusted core 146 (and maybe part of one or more of portions 148, 150, and 152). The exact acts performed by the initialization process can vary based on the specific manner in which the trusted core operates as well as the specific hardware of computer 100 (e.g., the CPU architecture), but generally include establishing the protection provided by the trusted core (e.g., setting up a trusted space) and initializing CPUs to use this protection. One of the things the "initialization code" must do is provide a "reset vector" which is left in place, and is always ready to deal with, any processor that is reset, initiated, hot-plug added, etc. By doing this, the trusted core ensures its continued integrity in the face of profound changes in the CPU configuration of the machine (e.g. having new ones added on the fly.)

Initialization of trusted core 146 begins in response to a "Trusted Core Initialization" command issued by one of CPUs 102, 104. The Trusted Core Initialization command is commonly issued during booting of computer 100, although it may occur any time during or after computer 100 has been fully booted. The Trusted Core Initialization command is designed to trigger initialization of the trusted core, and can be implemented in any of a wide variety of manners. For example, the command could be a write to a particular port, a write to a particular address, etc., however, the port or address should have the property that the trusted core can protect the port or address using whatever protection means that hardware provides after the core has gained control. This is to ensure that once a trusted core is running, it is not vulnerable to the simple denial of service attack that any untrusted code can remove it from memory or replace it. Alternatively, if such protection is not provided (e.g., the Trusted Core Initialization command has to be invoked by some unprotectable port) then it may be a "run once" operation which refuses to perform its function again until the system has been rebooted. However, such a machine loses the ability to stop and start trusted cores or to use more than one trusted core per boot.

In one implementation, the Trusted Core Initialization command includes three parameters: start, length of code, and length of memory. The start parameter refers to the location in memory 110 where trusted core 146 begins (e.g., the memory address of the first instruction of platform trusted code portion 148). Alternatively, especially in embodiments where trusted core 146 is not located in physically contiguous memory, a memory descriptor list (MDL) can be identified as the start parameter, identifying to memory controller 106 which memory pages include the trusted core. The length of code parameter refers to the length (e.g., the number of bytes) of the code of trusted core 146 (e.g., the combination of portions 148 and 150, but excluding trusted core data portion 152). The length of memory parameter refers to the length (e.g., the number of bytes) of trusted core (e.g., the combination of all three portions 148, 150, and 152). These parameters are passed to memory controller 106 either prior to (or as part of) the Trusted Core Initialization command. In one implementation, these parameters are loaded by one of CPUs 102, 104 into parameter registers 153 of memory controller 106 prior to issuance of the Trusted Core Initialization command.

Upon receipt of the Trusted Core Initialization command, memory controller 106 protects memory 110 from all CPUs 102, 104 and any other bus masters in computer 110. Given that CPUs 102, 104, as well as any other bus masters in computer 100, cannot directly access memory 110, but rather have to access memory 110 via memory controller 106, memory controller 106 can readily protect memory 110 from the CPUs and bus masters. By protecting memory 110, memory controller 106 ensures that other code (e.g., being executed by a CPU or controlling another bus master) does not interfere with the trusted core initialization process. In protecting memory 110, memory controller 106 initially allows the only access to memory 110 to be the memory refresh signals from a memory refresh controller (not shown) that allow DRAM to be refreshed and maintain its state.

On a machine with factored memory—that is, multiple blocks of memory with multiple memory controllers—multiple different approaches may be used. In one approach, the multiple memory controllers coordinate with each other to apply the Trusted Core Initialization operator across all memories. In another approach, the memory-controller/memory selected to do the Trusted Core Initialization does all of it (so the whole trusted core is loaded into one "bank") and other memory controllers ignore it. Since all of the trusted core is in a single protected memory bank, the activities of the others do not matter. The selected memory controller still forces the behavior of all CPUs, so the platform hardware is set up to allow it to do that.

Control logic 136 in memory controller 106 also sets a trusted core initialization bit 154 within a secure portion 156 of memory controller 106. This secure portion 156 is secure in that only control logic 136 is allowed to access the registers and/or memory within secure portion 156. Secure portion 156 may not be made visible to other components in computer 100 external to memory controller 106, or alternatively control logic 136 may simply ignore (or reject) any commands received at memory controller 106 attempting to access any register or memory within secure portion 156. The trusted core initialization bit 154 allows control logic 136 to know whether the trusted core initialization process is in-process, and the use of bit 154 is discussed in more detail below.

Memory controller 106 can protect memory 110 in a variety of different manners. In one implementation, memory controller 106 prevents CPUs 102, 104 from issuing read or write requests on processor bus 112, thereby preventing CPUs 102, 104 from accessing memory 110. The manner in which CPUs 102, 104 are kept off the bus varies based on the architecture of CPUs 102, 104 and processor bus 112 (e.g., in certain Intel-architecture implementations, CPUs can be prevented form issuing read and write requests on the bus by asserting a BNR# (Block Next Request) signal on processor bus 112, or by issuing a halt (e.g., HLT) command to the CPUs which halts the operation of each CPU until it is reset). CPUs 102, 104 will eventually be allowed to again issue read and write requests on processor bus 112, so control logic 136 also compares all requests that memory controller 106 receives from a CPU 102, 104 to the address range of trusted core 146 in memory 110—any request that memory controller 106 receives from a CPU 102, 104 during this trusted core initialization process (e.g., with bit 154 set) that is within this address range is accepted and responded to in a conventional manner, while any such request that is not within this address range or that is from a component other than a CPU 102, 104 is rejected (e.g., memory controller 106 may refuse to acknowledge the request, may deny the request, etc.). Alternatively, requests received that are not within this address range may be allowed, but with the understanding that such areas of memory are not protected.

Memory controller 106 also prevents other bus masters on I/O bus 114 from accessing memory 110. Additionally, memory controller 106 can prevent other bus masters on I/O bus 114 from affecting cache memories (e.g., within a CPU or on bus 112), such as by not issuing any such transactions onto bus 112. For example, memory controller 106 may have I/O controller 108 assert a signal on I/O bus 114 that prevents any of the bus masters from issuing read and write requests on bus 114. By way of another example, memory controller 106 may simply ignore any memory access requests it receives from I/O controller 108, such as by having I/O interface 134 deny such requests, refuse to accept or acknowledge such requests, etc. Although preventing access to memory 110 can be implemented in similar fashions for both CPU accesses and I/O bus master accesses, it should be noted that no I/O bus master accesses are allowed during the initialization process even though CPU access are allowed.

Memory controller 106 may immediately protect memory 110 upon receipt of the Trusted Core Initialization command, or alternatively wait for a period of time or for some other action to occur before protecting memory 110. For example, a particular bus master may be in the process of a long DMA transfer at the time the Trusted Core Initialization command is received, and memory controller 106 may opt to let the DMA transfer finish. Although the protection of memory 110 may not be immediate, the trusted core initialization process does not proceed until memory 110 is protected.

Once memory 110 is protected, control logic 136 generates a digest value based on trusted core 146. Alternatively, another component (not shown), such as a dedicated cryptographic processor, may be temporarily allowed access to memory 110 in order to generate the digest value (or the digest could be held in the cryptographic-processor, as long as the cryptographic-processor works intimately with the memory controller to perform the digest operation only when the CPU is performing the initialization process (and cannot be fooled by untrusted software making this request of the cryptographic-processor)). This access, however, may be limited, such as allowing the cryptographic processor to only read from memory 110. This digest is generated using the same cryptographic mechanism as discussed above. Control logic 136 then stores the generated digest value as digest 138 in secure portion 156 of memory controller 106. Digest 138 can then be used for subsequent certification and/or authentication purposes by trusted core 146.

Control logic 136 then maps the reset vector to a new reset vector, referred to as the initialization vector, so that memory controller 106 responds to the next read request for a particular address (e.g., $FFFFFFF0_{16}$) on processor bus 112 with the initialization vector. In situations where the CPU always starts executing from a known location (rather than using the indirection supplied by the reset-vector fetch procedure), control logic 136 arranges to issue an instruction(s) as the first one or few instructions that are fetched from the memory subsystem that causes the CPU to begin executing instructions at the start of the trusted core (e.g., a JUMP operation), or alternatively re-map the trusted core to appear at the fixed processor reset vector. This initialization vector is the first address of trusted core 146. In one implementation, this mapping is accomplished by control logic 136 writing the start location of trusted core 146 (e.g., received as a parameter of the Trusted Core Initialization command) as reset vector 140. Whenever memory controller 106 receives a read request for the particular address (e.g., $FFFFFFF0_{16}$) on processor bus 112, control logic 136 checks bit 154 of secure portion 156. If the bit is set, then the mapped reset vector 140 is returned to the requesting CPU as the reset vector. However, if the bit is not set, then the initial BIOS boot block address is returned to the requesting CPU.

Control logic 136 then asserts a reset signal to a CPU on processor bus 112. In the situation where multiple CPUs are on processor bus 112, the reset signal is asserted to all of the CPUs (although alternatively the reset signal may be directed to a single CPU). The manner in which the reset signal is asserted (and the nature of the reset signal itself) can vary based on the architecture of CPUs 102, 104 and processor bus 112 (e.g., in certain Intel-architecture implementations, all CPUs on processor bus 112 can be reset by asserting a RESET# signal on processor bus 112).

Alternatively, other mechanisms can be used to reset the CPUs on processor bus 112. The goal of resetting a CPU is to clear the CPU of its state (e.g., all instructions and data that may reside within registers, caches, buffers, etc. of the CPU) so that that prior state cannot compromise the execution integrity of the trusted core initialization process. For example, so that instructions of a malicious application that are stored in a CPU's cache cannot compromise the integrity of the trusted core initialization process.

In addition to resetting the CPUs on processor bus 112, any other cache memory or other device on processor bus 112 that includes memory is reset. For example, an additional L3 cache (not shown) may also be coupled to processor bus 112, in which case control logic 136 would reset that L3 cache as well as the CPUs. These additional cache memories or other devices on processor bus 112 can be reset in any of a variety of manners, such as writing random values to the memories, writing a string of zeroes or ones to the memories, removing power from the memories (e.g., temporarily not refreshing DRAMs), issuing specific bus transactions to invalidate entire caches or specific cache-line entries, etc.

After resetting CPUs 102, 104 (and any other caches or devices on processor bus 112 (except memory controller 106)), memory controller 106 allows one of the CPUs on processor bus 112 to access memory 110. In the illustrated example, any of the CPUs 102, 104 can be initially allowed to access memory 110 (although only one is allowed). Memory controller 106 can determine which of multiple processors to allow to access memory 110 in any of a variety of manners, such as some pre-determined setting, a random determination, allowing some external (or CPU-internal) bus arbitration mechanism to determine, etc.

For the purposes of discussion, assume that memory controller 106 determines to allow CPU 102 to access memory 110. Memory controller 106 then allows CPU 102 to access processor bus 112 (all other CPUs 104 are still prevented from accessing processor bus 112). Once a CPU is reset, the CPU will have no instructions (or at least no instructions or data that the CPU will read) in any of its caches or buffers. CPU 102 will thus request instructions to execute by asserting the particular address (e.g., FFFFFFF0$_{16}$) on processor bus 112. Memory controller 106 receives this request, control logic 136 determines that trusted core initialization process bit 154 is set, so memory controller 106 returns reset vector 140 to CPU 102. Also upon receipt of the particular address (e.g., FFFFFFF0$_{16}$) control logic sets an additional per-processor vector bit 158. This bit 158 allows control logic 136 to know, in the event another particular address (e.g., FFFFFFF0$_{16}$) is received, that reset vector 140 has already been returned to another processor. The use of bit 158 is discussed in more detail below.

Upon receipt of reset vector 140, CPU 102 issues a read request on processor bus 112 for the memory address in reset vector 140, which is the initial instruction in trusted core 146 (and the initial instruction in the trusted core initialization process). CPU 102 thus begins to execute the trusted core code 146. Since CPU 102 was reset, no instructions (e.g., malicious code) previously loaded into CPU 102 can affect its execution of trusted core 146. Additionally, since all other bus masters are prevented from accessing memory 110, they cannot alter the code 146 being fetched and executed by CPU 102 from memory 110.

CPU 102 continues to fetch and execute trusted core code 146, which initializes the trusted core in computer 100. As discussed above, the exact manner in which the trusted core is initialized can vary based on the architecture of computer 100, CPUs 102, 104, the type of trusted core being implemented, etc. As part of this initialization process, if trusted core 146 supports multiple processors, an additional CPU start vector is loaded as reset vector 142. This additional CPU start vector identifies the memory address in code 146 where additional instructions are to be fetched in the event additional processors begin executing instructions. This second reset vector can be used, for example, to have additional processors begin executing instructions elsewhere in the trusted core than the beginning of trusted core 146 (e.g., other than the beginning of the trusted core initialization part of code 146). However, since no other CPU is allowed to run until the "End of Initialization" the vector at 142 won't be used until after "End of Initialization".

Eventually the trusted core initialization process completes, and an "End of Initialization" command is issued by CPU 102. The End of Initialization command can be asserted in any of a variety of manners, analogous to the Trusted Core Initialization command discussed above. Upon receipt of the End of Initialization command, memory controller 106 allows all remaining CPUs 104 on processor bus 112 to access memory 110. Each of these CPUs 104, having been reset, will have no instructions (or at least no valid instructions) in any of their caches or buffers. Each CPU 104 will thus request instructions to execute by asserting the particular address (e.g., FFFFFFF0$_{16}$) on processor bus 112. Memory controller 106 receives these requests, control logic 136 determines that additional processor vector bit 158 is set, so memory controller 106 returns reset vector 142 to each of CPUs 104.

Control logic 136 then clears the trusted core initialization bit 154, as the trusted core initialization process is complete. Memory controller 106 also ceases preventing other bus masters 110 from accessing memory 110. Thus, any additional protection against malicious code from another bus master is to be prevented by the execution of the trusted core 146, not memory controller 106.

Each CPU 104, upon receipt of reset vector 142, issues a read request on processor bus 112 for the memory address in reset vector 142, which is an instruction in trusted core 146. Each CPU 104 thus begins to execute instructions in the trusted core code 146. Since each CPU 104 was reset, no instructions (e.g., malicious code) previously loaded into the CPU 104 can affect its execution of trusted core 146.

In one implementation, one or more of CPU 102, 104 may need microcode loaded into it in order to function properly. This microcode may, for example, fix errors or other bugs in the CPU, expose a different instruction set than the native instruction set of the CPU, etc. This microcode can be included in trusted core 146 (e.g., in trusted core data portion 152) and instructions included in the trusted core initialization process to load the microcode into the appropriate CPU(s). Additionally, the authenticity of the microcode may be verified, such as by re-computing a digest and comparing it to a certified digest within the microcode (e.g., placed there by the author or distributor of the microcode) to ensure that the microcode has not been altered since being signed by the distributor of the microcode.

In one implementation, memory controller 106 provides the following assurances in response to a Trusted Core Initialization command:

All I/O access to memory stops. No component can access memory except the refresh controller and CPUs (after being reset).

The cryptographic measure of the trusted core is computed after I/O accesses to memory stop.

No CPU is able to re-start and access memory until after it has been reset.

All CPUs begin executing instructions at one of two locations in the trusted core code, and that these locations are set from the trusted core code.

Only one of the CPUs will begin executing instructions at one of the two locations, all others will wait until the end of the trusted core initialization process and begin executing instructions at the other of the two locations.

No I/O access to memory is allowed until the trusted core initialization process has completed.

In addition, memory controller 106 may also operate to intercept and disallow any interrupts. For example, memory controller 106 may include, or alternatively be in communication with, the interrupt controller(s) for computer 100. Any interrupt received during the trusted core initialization process can be disallowed. Alternatively, memory controller 106 may not concern itself with interrupts (e.g., because the CPUs 102, 104 are reset, and limited by memory controller 106 and trusted core 146 in their ability to obtain instructions).

Additionally, in certain embodiments, the trusted core initialization process establishes certain regions of memory (either real and/or virtual regions) that are within the protected or curtained space of the trusted core. During operation of the trusted core, the trusted core operates to ensure that only trusted applications executing within that protected space can access other memory addresses within that protected space. In these embodiments, all controls of memory controller 106 (e.g., addressable portions of controller 106, such as parameter registers 153) are included within the protected space. Additionally, the mechanism via which the Trusted Core Initialization command is issued (e.g., a particular register address, a particular port, etc.) is also included in the protected space, preventing untrustworthy code from re-issuing the Trusted Core Initialization command.

In certain implementations, CPUs 102, 104 support two modes of operation: a real mode and a protected mode. Real mode refers to offering the programming environment of a predecessor CPU (e.g., the Intel 8086 processor), while protected mode makes all instructions and architectural features of the CPU available. In these implementations, CPUs 102, 104 are initialized into real mode at power-on (and in response to a RESET# signal). The trusted core initialization process begins, for each CPU, by transitioning that CPU into protected mode and then turning memory paging on (memory paging refers to virtual memory, where "pages" of memory can be referenced by the CPU and swapped between memory 110 and another storage device (e.g., device 118) as needed). Care should thus be taken in the trusted core initialization process that for additional CPUs (after the initial CPU) that are reset and permitted to access memory, they be able to run in real mode for long enough to be transitioned to protected mode and paging turned on. This can be accomplished, for example, by care in selection of the additional processor start vector (reset vector 142).

Note also that if code external to the trusted core arranges a forced processor reset (this is often possible programmatically, and is typically possible on PC-class machines), then the processor will start up by executing the trusted core, and not code that can potentially subvert a running core. In this case, the core may choose to treat this as an exception condition, and destroy all existing internal state (clear memory), or can take action to continue execution (for example, reload the CPU protection profile that was in effect before the processor reset).

It should be noted that the trusted core initialization process does not require any additional bus transactions on processor bus 112, no additional pins on CPUs 102, 104, or other such modifications to the CPUs 102, 104. Rather, the initialization process is implemented in the memory controller (e.g., in the chipset), thereby preventing the need for any modifications to the CPUs.

Although discussed herein as primarily performed during booting of a computer, the trusted core initialization process can be performed at different times. For example, the trusted core may not be loaded into memory 110 and the Trusted Core Initialize command issued until an application that requires the trusted core to operate is to be executed (e.g., the user is going to download multimedia content that needs to be protected). Additionally, the trusted core initialization process can be repeated multiple times. By way of example, the trusted core code may have a "Terminate Trusted Core" command that terminates execution of the trusted core. However, the trusted core could again be loaded into memory 110 (if it were actually removed as part of the execution termination) at a later time, and the trusted core initialization process repeated for the trusted core code to begin executing again. And, multiple different trusted cores can be run, one at a time, one after the other.

Additionally, it should be noted that after the trusted core initialization process has completed and other CPUs are allowed to access memory, these additional CPUs need not have been present in the computer when the trusted core initialization process began. By way of example, the computer may support the ability to "hot-plug" CPUs (add CPUs to the computer while the computer is running). Any such newly added CPUs are allowed to access memory, starting execution of instructions at the additional processor reset vector.

FIG. 1 illustrates an exemplary architecture where a single memory controller 106 controls access to memory 110. Alternatively, the trusted core initialization process may be implemented in architectures where there are multiple memory controllers.

Figure 4:
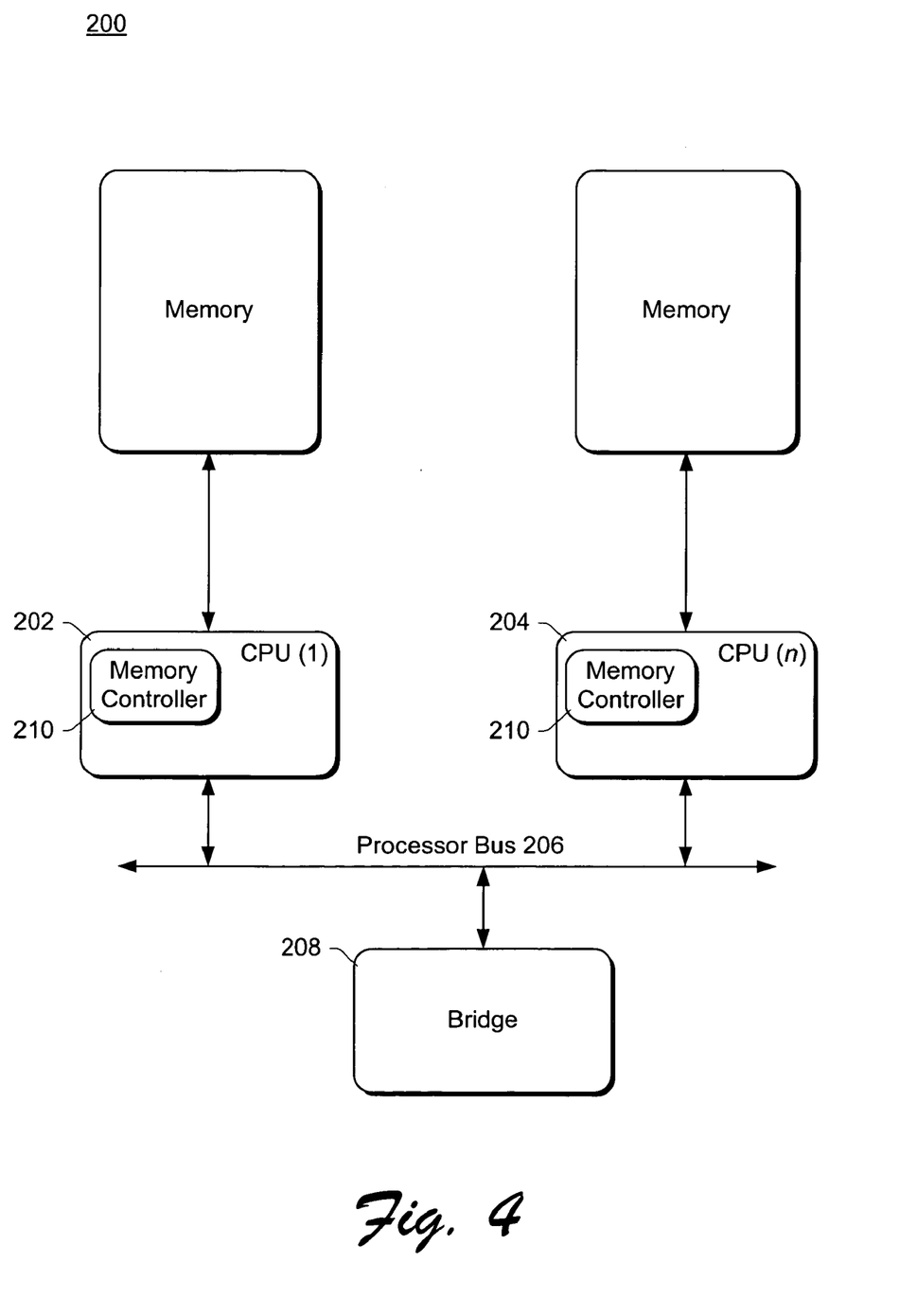
FIG. 4 illustrates an exemplary computer architecture employing distributed memory controllers in accordance with certain embodiments of the invention.

FIG. 4 illustrates an exemplary computer architecture employing distributed memory controllers in accordance with certain embodiments of the invention. Computer 200 is illustrated including multiple (m) CPUs 202, 204 coupled to a processor bus 206. CPUs 202, 204 communicate with various I/O components (not shown) via a bridge 208. Additionally, each CPU 202, 204 includes a memory controller 210. The individual memory controllers 210 implement a distributed memory controller architecture that performs analogous functions as memory controller 106 of FIG. 1, except that the individual controllers 210 are distributed across multiple CPUs. The distributed memory controller architecture can be implemented in any of a wide variety of conventional manners, and may include additional couplings (not shown) between the individual memory controllers 210 to allow communications to be passed among the memory controllers 210 (e.g., for synchronization of the individual memory controllers 210).

In the example of FIG. 4, each CPU includes its own directly attached memory. The bus logic and protocols included in computer 200 ensure that each CPU's view of the overall memory subsystem remains coherent. Such memory architectures are often referred to as cache-coherent non-uniform-memory-access systems (CC-NUMA). Alternatively, rather than each CPU having its own attached memory, the memory controllers may be distributed among the multiple CPUs, but access a single shared system memory.

Figure 5:
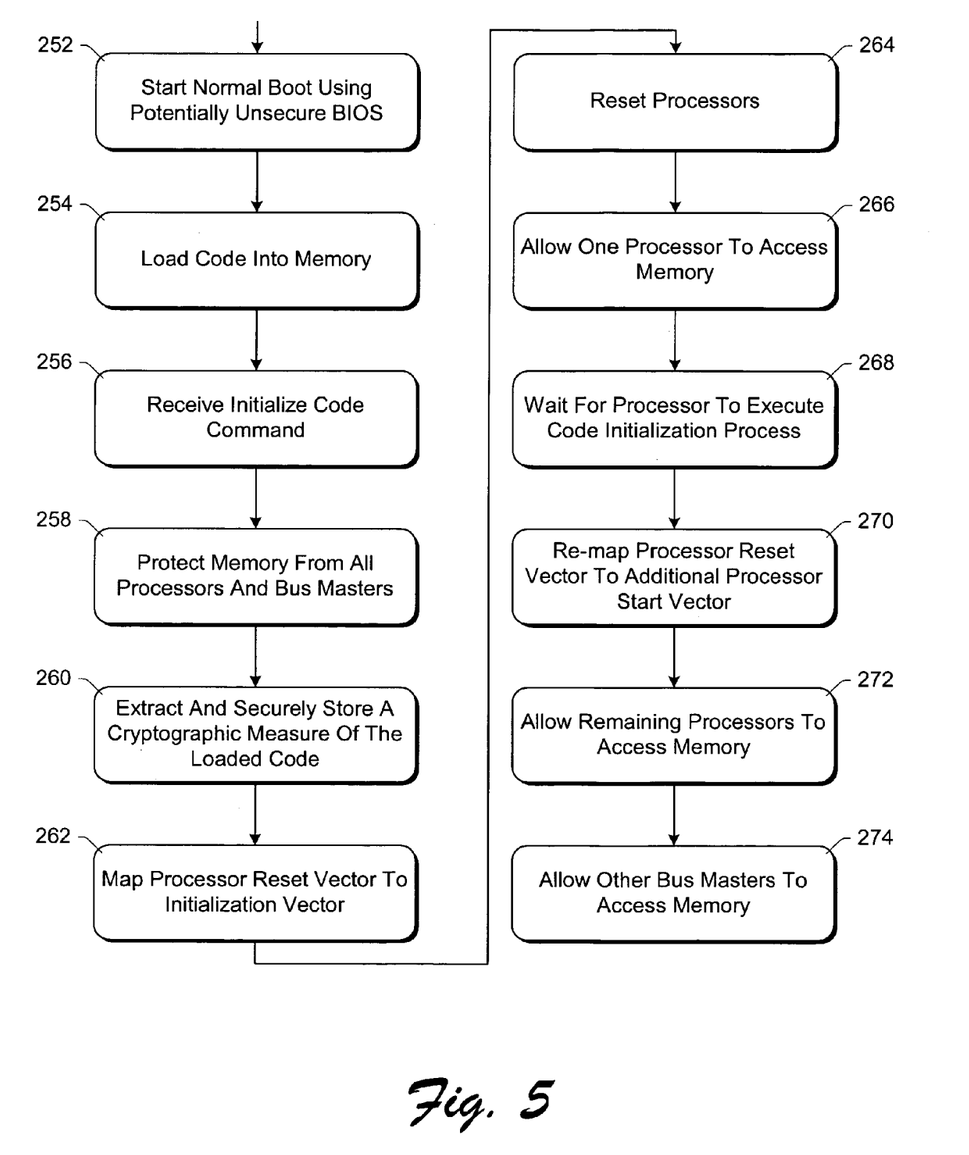
FIG. 5 is a flowchart illustrating an exemplary process for a code initialization process in accordance with certain embodiments of the invention.

FIG. 5 is a flowchart illustrating an exemplary process for a code initialization process in accordance with certain embodiments of the invention. The process of FIG. 5 is implemented by a computer, such as computer 100 of FIG. 1 or computer 200 of FIG. 4, and may be implemented in software. The process of FIG. 5 may be used for a trusted core initialization process, or alternatively an initialization process for other code.

Initially, the normal boot process for the computer is started using the not necessarily secure BIOS (act 252). Eventually, the code is loaded into memory (act 254) and an Initialize Code command received (act 256). In response to the Initialize Code command, memory is protected from all processors and bus masters (act 258). A cryptographic measure of the code in memory is then extracted and stored in a secure location (act 260). The processor reset vector is then mapped to an initialization vector (act 262), such as the start of the code in the memory.

Once the processor reset vector is mapped to the initialization vector, all the processors are reset (act 264) and one of the processors is allowed to access memory (act 266). The process then waits for the processor that is allowed to access memory to execute a code initialization process from the memory (act 268). The end of the code initialization process is signaled, for example, by a command issued from the processor executing code initialization process. Once the code initialization process is finished, the processor reset vector is re-mapped to an additional processor start vector (act 270). Any other processors in the computer are then allowed to access memory (act 272), as are any other bus masters in the computer (act 274).

In the discussion herein, embodiments of the invention are described in the general context of processor-executable instructions, such as program modules or code, being executed by one or more conventional processors or controllers (e.g., control logic 136 of FIG. 1). Generally, program modules or code include routines, programs, objects, components, data structures, etc. that perform particular tasks or implement particular abstract data types. In a distributed environment, program modules or code may be located in multiple memory storage devices.

Alternatively, embodiments of the invention can be implemented in hardware or a combination of hardware, software, and/or firmware. For example, all or part of the invention can be implemented in one or more application specific integrated circuits (ASICs) or programmable logic devices (PLDs). Computing devices (such as device 100 of FIG. 1 or device 200 of FIG. 4) typically include at least some form of computer readable media. Computer readable media can be any available media that can be accessed by a computing device. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by the computing device. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. An apparatus comprising:
   a processor reset portion to assert a reset signal to a processor;
   a memory protector portion to prevent any bus master from accessing memory until the processor completes execution of a trusted core initialization process; and
   a controller, coupled to the memory protector portion, to:
      map a processor reset vector to an initialization vector;
      receive a read request corresponding to the processor reset vector from the processor;
      return, in response to the read request, the initialization vector to the processor; and
      allow the processor to access the memory beginning with the initialization vector.

2. An apparatus as recited in claim 1, wherein the controller is further to:
   re-map the processor reset vector to an additional processor start vector after returning the initialization vector to the processor; and
   return, in response to another read request corresponding to the processor reset vector from another processor, the additional processor start vector.

3. A memory controller comprising:
   a first interface to allow communication with a processor;
   a second interface to allow communication with a system memory; and
   a controller, coupled to the first interface and the second interface, to reset a processor and to allow the processor to execute a code initialization process while preventing any other processors from accessing the system memory;
   wherein the controller is further to:
      map a processor reset vector to an initialization vector;
      receive a read request corresponding to the processor reset vector from the processor;
      return, in response to the read request, the initialization vector to the processor; and
      allow the processor to access the memory beginning with the initialization vector.

4. A memory controller as recited in claim 3, wherein the memory controller is included in a processor.

5. A memory controller as recited in claim 3, wherein the first interface comprises a processor bus interface.

6. A memory controller as recited in claim 5, wherein the memory controller operates without requiring the processor bus interface to support any additional commands on the processor bus.

7. A memory controller as recited in claim 3, wherein the system memory comprises a dynamic random access memory.

8. A memory controller as recited in claim 3, wherein the controller is further to allow the processor to execute the code initialization process while preventing any bus masters from accessing the system memory.

9. A memory controller as recited in claim 3, wherein the controller is further to:
   reset any other processor coupled to the memory controller prior to allowing the processor to execute the code initialization process;
   prevent any other processor and any bus master coupled to the memory controller from accessing the system memory until the processor executes the code initialization process; and
   after execution of the code initialization process, allow any other central processing units coupled to the memory controller and any bus masters coupled to the memory controller to access the memory.

10. A memory controller as recited in claim 3, wherein the initialization vector is an address within the code initialization process.

11. A memory controller as recited in claim 3, wherein the controller is further to:
  re-map the processor reset vector to an additional processor start vector after returning the initialization vector to the processor; and
  return, in response to any other read request corresponding to the processor reset vector from another processor, the additional processor start vector.

12. A memory controller as recited in claim 11, wherein the initialization vector is an address within the code initialization process and wherein the additional processor start vector and the initialization vector are different addresses within the code initialization process.

13. A memory controller as recited in claim 3, wherein the controller is to reset the processor by clearing a state of the processor.

14. A memory controller as recited in claim 13, wherein the clearing the state of the processor comprises clearing all instructions and data from any caches or buffers of the processor.

15. A memory controller as recited in claim 3, wherein the controller is to reset the processor by asserting, on a processor bus, a reset signal to the processor.

16. A memory controller as recited in claim 15, wherein the reset signal comprises RESET#.

17. A method comprising;
  allowing a computer to begin operation based on untrustworthy code;
  loading, under the control of the untrustworthy code, additional code into memory;
  initiating execution of the additional code in a secure manner despite the untrustworthy code in the computer;
  mapping a central processing unit reset vector to an initialization vector;
  receiving a read request corresponding to the central processing unit reset vector from one central processing unit;
  returning, in response to the read request, the initialization vector to the one central processing unit; and
  allowing the one central processing unit to access the memory beginning with the initialization vector.

18. A method as recited in claim 17, wherein the initiating further comprises initiating execution of the additional code in a secure manner despite both the untrustworthy code in the computer and other pre-existent state of the computer.

19. A method as recited in claim 17, wherein the initiating execution of the additional code in a secure manner comprises:
  preventing each of one or more central processing units in the computer from accessing the memory;
  preventing each of one or more bus masters in the computer from accessing the memory;
  resetting each of the one or more central processing units;
  allowing the one central processing unit to access the memory and execute a code initialization process; and
  after execution of the code initialization process, allowing any other central processing units and any of the one or more bus masters to access the memory.

20. A method as recited in claim 17, wherein the initiating comprises initiating execution of the additional code in a secure manner without requiring any additional bus transactions to be supported by a processor in the computer.

21. A method as recited in claim 17, further comprising:
  re-mapping the central processing unit reset vector to an additional central processing unit start vector after returning the initialization vector to the one central processing unit; and
  returning, in response to any other read request corresponding to the central processing unit reset vector from another central processing unit, the additional central processing unit start vector.

22. A method as recited in claim 17, wherein the loading the additional code comprises copying different portions of the additional code from a plurality of different sources including one or more of: a local mass storage device, a remote device, and a local chipset.

23. A method comprising:
  booting, based on untrustworthy code, a computer;
  loading a trusted core into memory; and
  initiating secure execution of the trusted core by:
    mapping a central processing unit reset vector to an initialization vector;
    resetting each of one or more central processing units in the computer;
    receiving, after the mapping and the resetting, a read request corresponding to the central processing unit reset vector from one of the one or more central processing units;
    returning, in response to the read request, the initialization vector to the one central processing unit; and
    allowing the one central processing unit to access the memory beginning with the initialization vector.

24. A method as recited in claim 23, wherein the initialization vector is an address within the trusted core in the memory.

25. A method as recited in claim 23, further comprising:
  re-mapping the central processing unit reset vector to an additional central processing unit start vector after returning the initialization vector to the one central processing unit; and
  returning, in response to any other read request corresponding to the central processing unit reset vector from another of the one or more central processing units, the additional central processing unit start vector.

26. A method as recited in claim 25, wherein the initialization vector is an address within the trusted core in the memory and wherein the additional central processing unit start vector and the initialization vector are different addresses within the trusted core in the memory.

27. One or more computer-readable media having stored thereon a plurality of instructions that, when executed by one or more processors of a computer, causes the one or more processors to perform acts including:
  allowing operation of the computer to begin based on untrusted code;
  loading, under control of the untrusted code, a trusted core into memory;
  preventing each of one or more central processing units and each of one or more bus masters in the computer from accessing the memory;
  resetting each of the one or more central processing units;
  allowing one central processing unit to access the memory and execute trusted core initialization code to initialize the trusted core;
  after execution of the trusted core has been initialized, allowing any other central processing units and any bus masters in the computer to access the memory;
  wherein the plurality of instructions further cause the one or more processors to perform acts including:
    mapping a central processing unit reset vector to an initialization vector;

receiving a read request corresponding to the central processing unit reset vector from the one central processing unit;

returning, in response to the read request, the initialization vector to the one central processing unit; and allowing the one central processing unit to access the memory beginning with the initialization vector.

28. One or more computer-readable media as recited in claim 27, wherein the one or more processors comprise one or more controllers of one or more memory controllers.

29. One or more computer-readable media as recited in claim 28, wherein the one or more memory controllers are distributed among the one or more central processing units.

30. One or more computer-readable media as recited in claim 28, wherein the plurality of instructions comprise microcode to be executed by the one or more memory controllers.

31. One or more computer-readable media as recited in claim 27, wherein the untrusted code includes code from a basic input output system (BIOS) and code from a plurality of option read only memories (ROMs).

32. One or more computer-readable media as recited in claim 27, wherein the preventing comprises preventing each of the one or more central processing units and each of the one or more bus masters from accessing the memory in response to an initialize trusted core command received from one of the one or more central processing units.

33. One or more computer-readable media as recited in claim 27, wherein the loading the trusted core comprises copying different portions of the trusted core from a plurality of different sources.

34. One or more computer-readable media as recited in claim 27, wherein the loading the trusted core comprises copying different parts of the trusted core from one or more sources and combining the different parts to assemble the trusted core.

35. One or more computer-readable media as recited in claim 34, wherein combining the different parts comprises exclusive-ORing bits of the different parts.

36. One or more computer-readable media as recited in claim 27, wherein the loading the trusted core comprises copying at least a portion of the trusted core from a local mass storage device into the memory.

37. One or more computer-readable media as recited in claim 27, wherein the loading the trusted core comprises copying at least a portion of the trusted core from a remote device into the memory.

38. One or more computer-readable media as recited in claim 27, wherein the loading the trusted core comprises copying at least a portion of the trusted core from a chip of the computer.

39. One or more computer-readable media as recited in claim 27, wherein the preventing comprises ignoring all requests for access to the memory from the one or more central processing units and one or more bus masters.

40. One or more computer-readable media as recited in claim 27, wherein the plurality of instructions further cause the one or more processors to perform acts including:

extracting a cryptographic measure of the trusted core in the memory; and storing the extracted cryptographic measure.

41. One or more computer-readable media as recited in claim 40, wherein the plurality of instructions further cause the one or more processors to perform acts including:

resetting a cryptographic processor;

requesting the cryptographic processor to extract the cryptographic measure; and receiving the extracted cryptographic measure from the cryptographic processor.

42. One or more computer-readable media as recited in claim 27, wherein the resetting each of the one or more central processing units comprises asserting a processor bus reset signal to each of the one or more central processing units.

43. One or more computer-readable media as recited in claim 27, wherein the initialization vector is an address within the trusted core in the memory.

44. One or more computer-readable media as recited in claim 27, wherein the plurality of instructions further cause the one or more processors to perform acts including:

re-mapping the central processing unit reset vector to an additional central processing unit start vector after returning the initialization vector to the one central processing unit; and returning, in response to any other read request corresponding to the central processing unit reset vector from another central processing unit, the additional central processing unit start vector.

45. One or more computer-readable media as recited in claim 44, wherein the initialization vector is an address within the trusted core in the memory and wherein the additional central processing unit start vector and the initialization vector are different addresses within the trusted core in the memory.

46. One or more computer-readable media as recited in claim 44, wherein both the initialization vector and the additional central processing unit start vector are obtained from the trusted core.

47. One or more computer-readable media as recited in claim 1, wherein the plurality of instructions further cause the one or more processors to perform acts including loading microcode from the trusted core in memory into the one central processing unit after resetting the central processing unit.

48. One or more computer-readable media as recited in claim 1, wherein the resetting comprises asserting, on a processor bus, a RESET# signal to each of the one or more central processing units.

49. One or more computer-readable media as recited in claim 27, wherein the resetting comprises clearing a state of each of the one or more central processing units.

50. One or more computer-readable media as recited in claim 49, wherein the state of a central processing unit comprises instructions and data residing in any caches and buffers of the central processing unit.

51. One or more computer-readable media as recited in claim 49, wherein the state of a central processing unit comprises instructions and data residing in any registers of the central processing unit.

* * * * *